(12) United States Patent
Kitaguchi et al.

(10) Patent No.: US 8,882,178 B2
(45) Date of Patent: Nov. 11, 2014

(54) BODY FOR DUMP TRUCK

(75) Inventors: Atsushi Kitaguchi, Tsuchiura (JP);
Takayuki Satou, Tsuchiura (JP);
Kazunori Ishihara, Tsuchiura (JP);
Yasuki Kita, Tsuchiura (JP); Takehito Ikema, Tsuchiura (JP); Tomohiko Yasuda, Tsuchiura (JP); Takashi Sasaki, Tsuchiura (JP); Yoshifumi Nabeshima, Tsuchiura (JP); Hitomi Ooshima, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 13/805,232

(22) PCT Filed: Jun. 29, 2010

(86) PCT No.: PCT/JP2010/004296
§ 371 (c)(1),
(2), (4) Date: Dec. 18, 2012

(87) PCT Pub. No.: WO2012/001738
PCT Pub. Date: Jan. 5, 2012

(65) Prior Publication Data
US 2013/0088067 A1 Apr. 11, 2013

(51) Int. Cl.
*B60P 1/28* (2006.01)
(52) U.S. Cl.
CPC .. *B60P 1/28* (2013.01); *B60P 1/286* (2013.01)
USPC ....................................................... 296/183.2

(58) Field of Classification Search
USPC ....................................................... 296/183.2
See application file for complete search history.

(56) References Cited

U.S. PATENT DOCUMENTS

| 3,363,933 | A |   | 1/1968 | Wilson |         |
|-----------|---|---|--------|--------|---------|
| 3,462,187 | A |   | 8/1969 | Hassler |        |
| 4,826,233 | A | * | 5/1989 | Hagenbuch | 296/39.3 |
| 5,312,162 | A |   | 5/1994 | Baebel |         |
| 5,431,475 | A | * | 7/1995 | Perry  | 296/183.1 |

(Continued)

FOREIGN PATENT DOCUMENTS

| EP | 0 098 127 A1 | 1/1984 |
|----|--------------|--------|
| GB | 887 117 A    | 1/1962 |

(Continued)

OTHER PUBLICATIONS

International Search Report dated Feb. 28, 2011 (three (3) pages).

*Primary Examiner* — Glenn Dayoan
*Assistant Examiner* — Jason S Daniels
(74) *Attorney, Agent, or Firm* — Crowell & Moring LLP

(57) ABSTRACT

A body for a dump truck includes a body frame, a bottom wall, front wall, and left and right side walls arranged on the body frame. The body also includes an earth/sand anti-sticking device and a steel member arranged outside and opposite the earth/sand anti-sticking device such that a space is formed between the steel member and the earth/sand anti-sticking device. The body is provided with at least one steel rib arranged in the space, fixedly secured to the steel member to reinforce the steel member, and arranged extending upright toward the earth/sand anti-sticking device. The steel member is any one of the bottom wall, front wall, and left and right walls, and the steel rib is shaped to divide the space.

8 Claims, 8 Drawing Sheets

(56) References Cited

U.S. PATENT DOCUMENTS

| | | | |
|---|---|---|---|
| 5,662,374 A * | 9/1997 | Wheeler | 296/183.2 |
| 6,592,171 B1 | 7/2003 | Hinds | |
| 6,592,172 B2 | 7/2003 | Fujan et al. | |
| 2004/0026959 A1* | 2/2004 | Kostecki | 296/183.2 |
| 2004/0036245 A1 | 2/2004 | Mollhagen | |
| 2008/0067856 A1* | 3/2008 | Hagenbuch | 298/17 R |

FOREIGN PATENT DOCUMENTS

| | | |
|---|---|---|
| JP | 53-87416 A | 8/1978 |
| JP | 2000-203325 A | 7/2000 |
| JP | 2001-233242 A | 8/2001 |

* cited by examiner

BODY FOR DUMP TRUCK

TECHNICAL FIELD

This invention relates to a body for a dump truck, which is provided with a payload section defined by a bottom wall, a front wall, and left and right side walls, and also with plural stiffeners installed on outer sides of the payload section and reinforcing the associated ones of the bottom wall, front wall and left and right side walls.

BACKGROUND ART

Patent Document 1 discloses a dump truck. This dump truck is provided with a pair of left and right front wheels, a pair of left and right rear wheels, a frame, an operator's cab arranged on the frame at a front position thereof, and a body arranged on the frame.

Patent Document 2 shows a body for a dump truck, which is constructed as described above. This body includes a body frame, and a bottom wall, front wall and left and right side walls arranged on the body frame. Defined by the bottom wall, front wall and left and right side walls is a payload section in which an object to be hauled such as earth or sand, that is, a payload is loaded. Many stiffeners are installed at positions on outer sides of the payload section. These stiffeners are installed extending in vertical directions or horizontal directions of the associated ones of the bottom wall, front wall and left and right side walls defining the payload section, and are reinforcing these walls.

Patent Document 3 shows a construction in which sloping devices are provided in corner parts of a bottom wall forming a payload section of a body for a dump truck. These sloping devices make up earth/sand anti-sticking devices that prevent sticking of earth or sand loaded in the payload section.

In general, a payload such as earth or sand is loaded in a heap in the payload section formed in the body of each dump truck described above, and by the payload, a high load is applied to the body. Rigidity is, therefore, required for the body. To assure this rigidity, many stiffeners are installed on parts of outer sides of the payload section as disclosed in the above-discussed Patent Document 2.

CITATION LIST

Patent Literature

Patent Document 1: U.S. Pat. No. 6,592,171
Patent Document 2: U.S. Pat. No. 6,592,172
Patent Document 2: US-A-2004/0036245

DISCLOSURE OF INVENTION

Technical Problem

Many stiffeners, specifically steel stiffeners are conventionally installed on parts of outer sides of a payload section as described above, so that there is a problem in that the weight of a body becomes greater. Accordingly, a restriction is imposed on the authorized payload of the payload section of the body. Further, the mounting of the body leads to a deterioration in the travel fuel cost of a dump truck.

With the above-described circumstances of the conventional technologies in view, the present invention has as an object thereof the provision of a body for a dump truck, which is lightweight and can assure sufficient rigidity.

Means for Solving the Problem

To achieve this object, the present invention provides a body for a dump truck. The body is to be mounted on a frame of the dump truck, and includes a body frame, a bottom wall, front wall, and left and right side walls arranged on the body frame. The bottom wall, front wall and left and right side walls define a payload section for loading a payload therein. The body has an earth/sand anti-sticking device arranged in a corner part of the payload section to prevent earth or sand, which is to be loaded in the payload section, from sticking in the corner part. The body also has a steel member arranged outside and opposite the earth/sand anti-sticking device such that a space is formed between the steel member and the earth/sand anti-sticking device. The body is provided with at least one steel rib, which is arranged in the space, fixedly secured to the steel member to reinforce the steel member, and arranged extending upright toward the earth/sand anti-sticking device.

According to the present invention constructed as described above, the steel member can be reinforced by the at least one steel rib arranged in the space between the earth/sand anti-sticking device, which is arranged in the corner part of the payload section, and the steel member arranged opposite the earth/sand anti-sticking device. Sufficient rigidity can, therefore, be assured even if fewer stiffeners are installed on parts of outer sides of the payload section. Further, the rib is arranged in the space between the earth/sand anti-sticking device and the steel member, so that the shape and dimensions of the rib can be made far smaller compared with those of the stiffeners installed on the parts of the outer sides of the payload section. Described specifically, the total weight of such ribs and stiffeners can be significantly reduced compared with the total weight that would result if only stiffeners were installed in a large number, and therefore, the weight of the body can be reduced. Accordingly, the present invention can assure a light weight and also sufficient rigidity.

The body according to the present invention may be characterized in that in the above-described invention, the steel member is formed of at least one combination of mutually-adjacent plural ones of the bottom wall, front wall and left and right side walls, the space comprises a hollow part formed by the respective walls in the combination and the earth/sand anti-sticking device, and the rib is arranged in the hollow part, and is fixedly secured to the respective walls in the combination by welding. According to the present invention constructed as described above, the at least one combination of mutually-adjacent plural walls are each reinforced by the rib, so that the walls can be set smaller in thickness. The setting of such a smaller wall thickness can, therefore, realize a further weight reduction.

The body according to the present invention may also be characterized in that in the above-described invention, the earth/sand anti-sticking device is made of a steel plate, and the plate is arranged as a discrete member from the associated ones of the bottom wall, front wall and left and right side walls and is formed of a sloping plate arranged aslant relative to the associated walls or a curved plate forming a curved surface. According to the present invention constructed as described above, no cumbersome bending work is needed for the formation of the earth/sand anti-sticking device on the associated ones of the bottom wall, front wall and left and right side walls, and the earth/sand anti-sticking device can be arranged with relative ease by welding the sloping plate or curved plate to the associated ones of the bottom wall, front wall and left and right side walls.

The body according to the present invention may also be characterized in that in the above-described invention, the sloping plate or curved plate and the rib are fixed together by plug welding. According to the present invention constructed as described above, the sloping plate or curved plate and the rib are surely maintained in contact with each other by plug welding. Therefore, a load of a payload can be transmitted from the sloping plate or curved plate to the rib, and the load transmitted to the rib can then be transmitted to the associated ones of the bottom wall, front wall and left and right side walls. It is hence possible to reduce a load to be applied to the sloping plate or curved plate.

The body according to the present invention may also be characterized in that in the above-described invention, the earth/sand anti-sticking device and the rib are arranged in contact with each other. According to the present invention constructed as described above, a load of a payload can be transmitted from the earth/sand anti-sticking device to the rib, and the load transmitted to the rib can then be transmitted to the associated ones of the bottom wall, front wall and left and right side walls. It is hence possible to reduce a load to be applied to the earth/sand anti-sticking device.

The body according to the present invention may also be characterized in that in the above-described invention, the bottom wall, front wall and left and right walls are made of steel plates, respectively, a steel stiffener is installed on an outer side of one of the bottom wall, front wall and left and right walls to reinforce the associated wall, and the stiffener is installed at a position such that the rib is connected to the stiffener with the associated wall interposed therebetween. According to the present invention constructed as described above, a load of a payload as transmitted from the earth/sand anti-sticking device to the rib can be transmitted to the stiffener via the associated wall interposed between the rib and the stiffener.

Advantageous Effects of the Invention

The present invention is provided with the earth/sand anti-sticking device arranged in the corner part of the payload section and also with the at least one steel rib arranged in the space between the earth/sand anti-sticking device and the steel member arranged opposite the earth/sand anti-sticking device, fixedly secured to the steel member to reinforce the steel member, and arranged extending upright toward the earth/sand anti-sticking device. It is, therefore, possible to assure a light weight and also sufficient rigidity. Owing to these advantageous effects, the restriction to the authorized payload of the payload section can be relaxed. Compared with the conventional dump trucks, it is thus possible to increase the authorized payload and to improve the efficiency of hauling work by the dump truck. Moreover, the dump truck can enjoy improved travel fuel efficiency compared with the conventional dump trucks, and therefore, can assure excellent economy.

MODES FOR CARRYING OUT THE INVENTION

The embodiments of the body according to the present invention for the dump truck will hereinafter be described based on the drawings.

Figure 1:
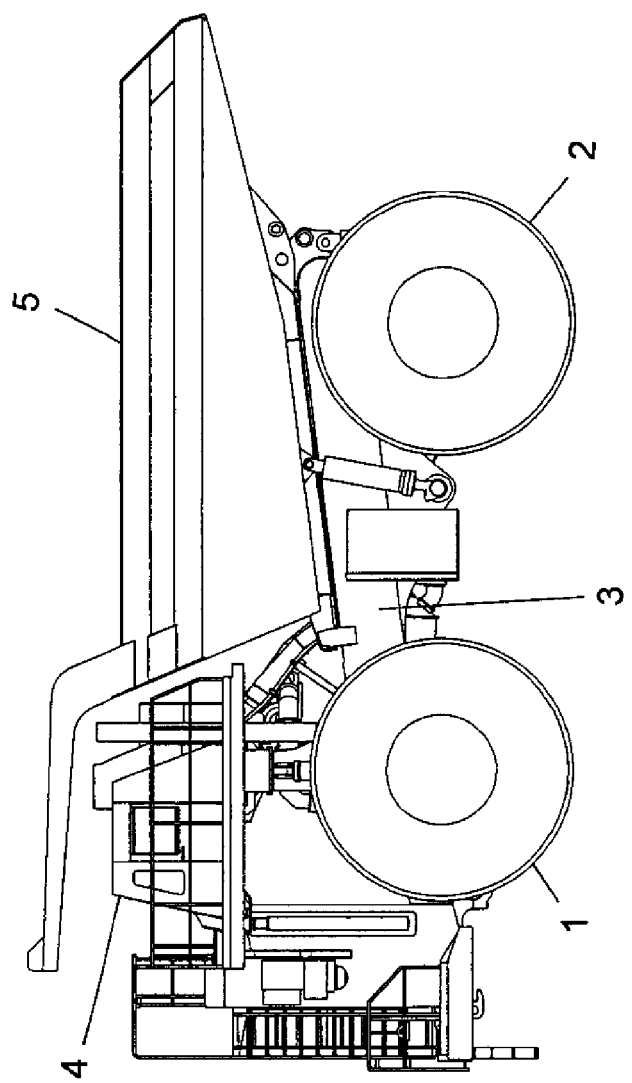
FIG. 1 A side view illustrating a dump truck provided with a first embodiment of the body according to the present invention.

As illustrated in FIG. 1, the dump truck provided with the first embodiment of the body according to the present invention is provided with a pair of left and right front wheels 1, a pair of left and right rear wheels 2, and a frame 3. Also provided are an operator's cab 4 arranged on the frame 3 at a front position thereof, and a body 5 of the first embodiment mounted on the frame 3.

Figure 2:
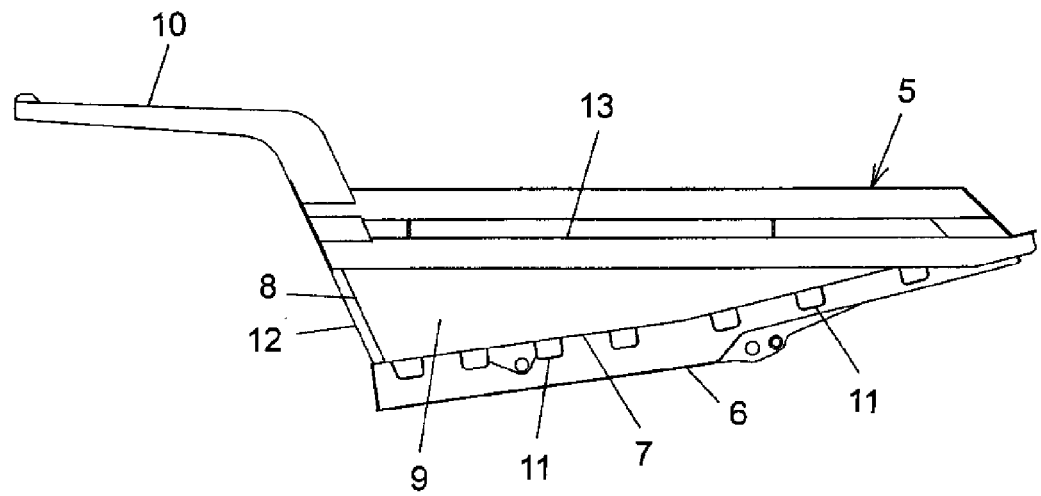
FIG. 2 A side view illustrating the first embodiment of the body according to the present invention.
Figure 3:
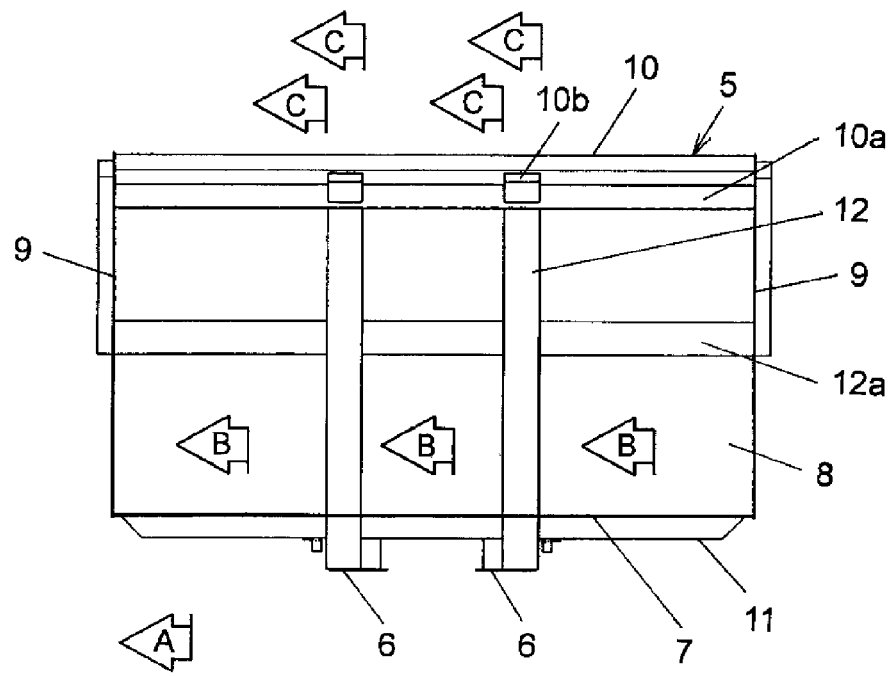
FIG. 3 A front view illustrating the first embodiment of the body according to the present invention.
Figure 4:
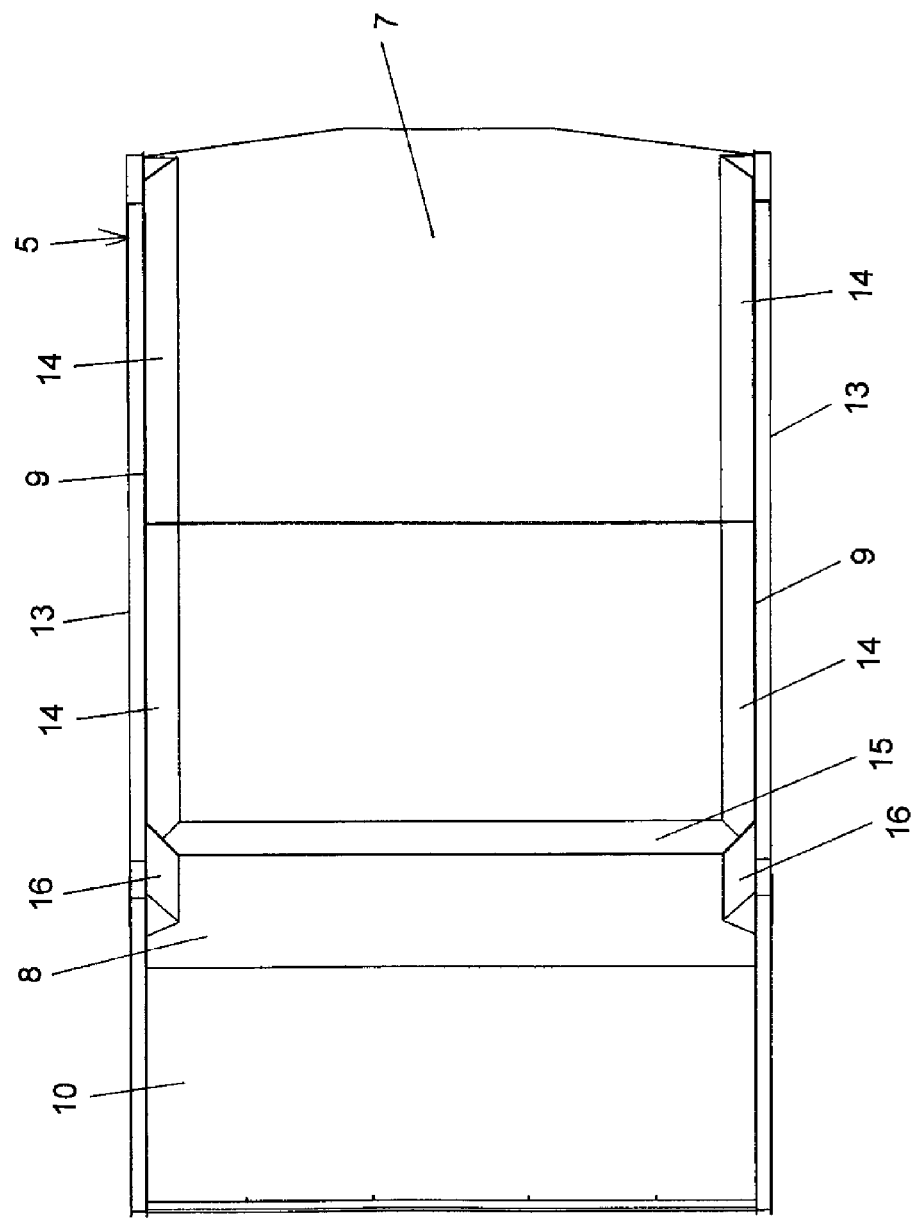
FIG. 4 A plan view illustrating the first embodiment of the body according to the present invention.

FIGS. 2 to 4 are views illustrating the first embodiment of the body according to the present invention, in which FIG. 2 is a side view, FIG. 3 is a front view, and FIG. 4 is a plan view.

As illustrated in FIGS. 2 to 4, the body 5 includes body frames 6 arranged extending in a front-to-rear direction, and a bottom wall 7, front wall 8 and left and right side walls 9 arranged on the body frames 6 and made, for example, of steel plates, respectively. The mutually-adjacent ones of these walls have been fixedly secured together by welding. The bottom wall 7, front wall 8 and left and right side walls 9 define a payload section in which an object to be hauled such as earth or sand, that is, a payload is loaded. A canopy 10 made of a steel plate is fixedly secured on the front wall 8 such that it covers over the operator's cab 4 as also depicted in FIG. 1.

At positions on respective outer sides of the bottom wall 7, front wall 8 and left and right side walls 9 defining the payload section, steel stiffeners are installed extending in vertical or horizontal directions on the associated walls. These steel stiffeners have been fixedly secured by welding to reinforce the associated walls. Described specifically, the bottom wall 7 is provided, as depicted in FIGS. 2 and 3, with plural stiffeners 11 installed in a lateral direction such that they extend at right angles to the body frames 6 arranged extending in the front-to-rear direction. The front wall 8 is provided, as shown in FIGS. 2 and 3, with two stiffeners 12 installed extending in a vertical direction and also with a stiffener 12a installed in the lateral direction such that it extends at a right angle to the stiffeners 12. The left and right side walls 9 are each provided, as illustrated in FIGS. 2 to 4, with two stiffeners 13 installed in the front-to-rear direction. As shown in FIG. 3, the canopy 10 is provided on a lower side thereof with a stiffener 10a installed extending in the lateral direction and also with two stiffeners 10b installed in the front-to-rear direction such that they extend at right angles to the stiffener 10a.

As illustrated in FIG. 4, in corner parts of the payload section, said corner parts including seams, earth/sand anti-sticking devices are arranged to prevent sticking of earth or sand to be loaded in the payload section. These earth/sand anti-sticking devices are arranged as discrete members, for example, from the associated ones of the bottom wall 7, front wall 8 and left and right side walls 9, and are formed of sloping plates 14-16 arranged aslant relative to the associated walls. Described specifically, the sloping plates 14 are individually arranged in two corner parts formed by the bottom wall 7 and the left and right side walls 9 and extending in the front-to-rear direction, and these sloping plates 14 have been fixedly secured by welding to the bottom wall 7 and also to the associated ones of the left and right side walls 9. The sloping plate 15 is arranged in a corner part formed by the bottom wall 7 and the front wall 8 and extending in the lateral direction, and this sloping plate 15 has been fixedly secured to the bottom wall 7 and the front wall 8, respectively, by welding. Further, the sloping plates 16 are individually arranged in two corner parts formed by the front wall 8 and the left and right side walls 9, respectively, and extending in the vertical direction, and these sloping plates 16 have been fixedly secured by welding to the front wall 8 and also to the associated ones of the left and right side walls.

Figure 5:
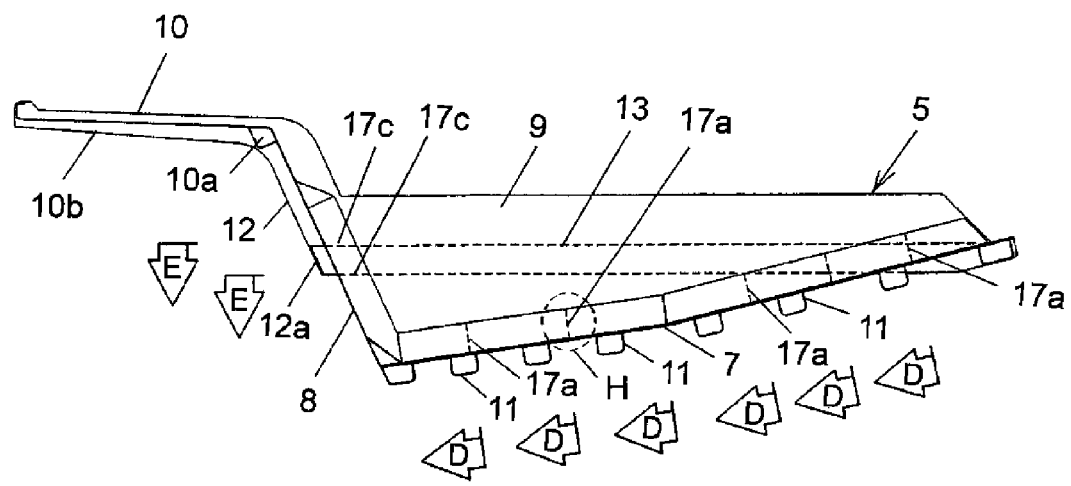
FIG. 5 A cross-sectional view taken in the direction of arrow A in FIG. 3.
Figure 6:
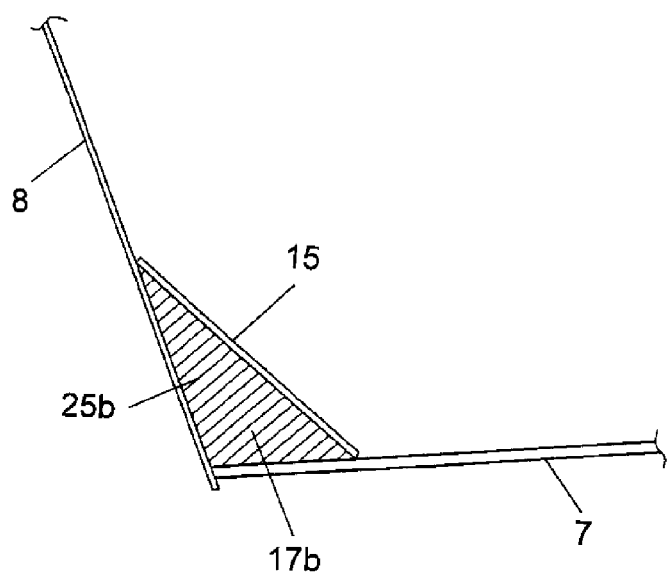
FIG. 6 A cross-sectional view taken in the direction of arrow B in FIG. 3.
Figure 7:
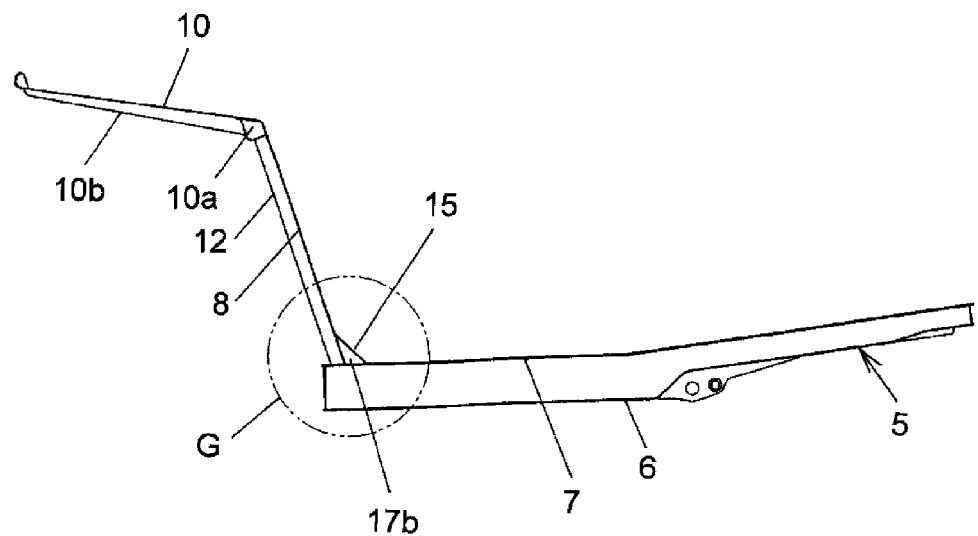
FIG. 7 A cross-sectional view taken in the direction of arrow C in FIG. 3.
Figure 8:
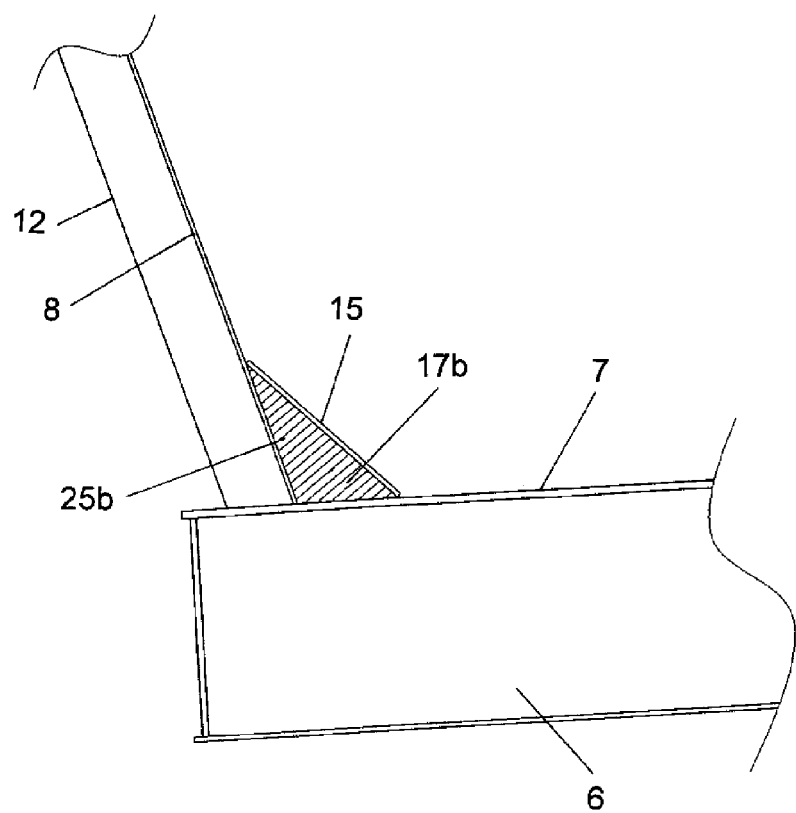
FIG. 8 An enlarged view of area G in FIG. 7.
Figure 9:
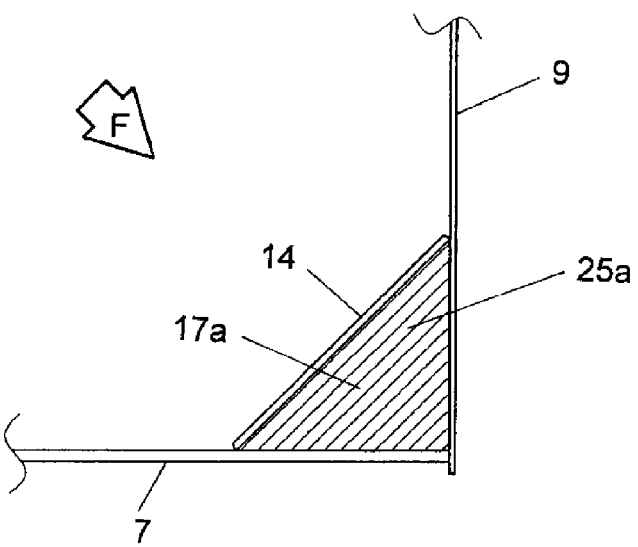
FIG. 9 A cross-sectional view taken in the direction of arrow D in FIG. 5.

FIG. 5 is a cross-sectional view taken in the direction of arrow A in FIG. 3, FIG. 6 is a cross-sectional view taken in the direction of arrow B in FIG. 3, FIG. 7 is a cross-sectional view taken in the direction of arrow C in FIG. 3, and FIG. 8 is an enlarged view of area G in FIG. 7. FIG. 9 is a cross-sectional view taken in the direction of arrow D in FIG. 5, and FIG. 10 is a cross-sectional view taken in the direction of arrow E in FIG. 5.

Figure 10:
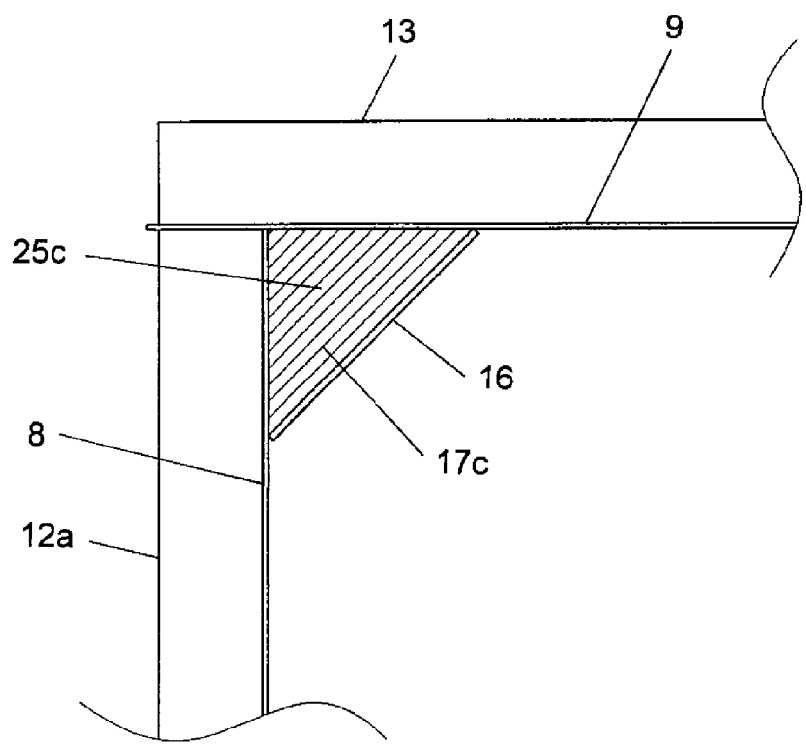
FIG. 10 A cross-sectional view taken in the direction of arrow E in FIG. 5.

Between the above-described earth/sand anti-sticking devices, that is, the sloping plates 14-16 and the steel members arranged opposite these sloping plates 14-16, that is, the associated ones of the bottom wall 7, front wall 8 and left and right side walls 9, spaces, for example, hollow parts 25a-25c depicted in FIGS. 6, 8, 9 and 10 are formed. Described specifically, as shown in FIG. 9, the two hollow parts 25a are formed by the bottom wall 7, the associated ones of the left and right side walls 9 and the associated sloping plates 14. As depicted in FIGS. 6 and 8, the hollow part 25b is formed by the bottom wall 7, front wall 8 and sloping plate 15. As illustrated in FIG. 10, the two hollow parts 25c are formed by the front wall 8, the associated ones of the left and right side walls 9 and the associated sloping plates 16.

The body 5 according to the first embodiment is equipped with steel ribs 17a-17c arranged in the above-described hollow spaces 25a-25c, fixedly secured to the associated combinations of the mutually-adjacent plural ones of the bottom wall 7, front wall 8 and left and right side walls 9 to reinforce these walls, and arranged extending upright toward the associated ones of the earth/sand anti-sticking devices, that is, the sloping plates 14-16. At least one steel rib is arranged for each of the above-described combinations. Described specifically, as shown by way of example in FIGS. 5 and 9, plural ones of the ribs 17a of triangular shape are arranged in each of the two hollow parts 25a formed by the bottom wall 7, the associated ones of the left and right side walls 9 and the associated ones of the sloping plates 14. As illustrated by way of example in FIGS. 6 and 8, the plural ribs 17b of triangular shape are arranged in the hollow part 25b formed by the bottom wall 7, the front wall 8 and the sloping plate 15. As depicted by way of example in FIG. 10, plural ones of the ribs 17c of triangular shape are arranged in each of the two hollow parts 25c formed by the front wall 8, the associated ones of the left and right side walls 9 and the associated sloping plates 16.

It is to be noted that as illustrated in FIG. 5, the above-described plural ribs 17a arranged in each hollow part 25a include those arranged at positions opposite the stiffeners 11 with the bottom wall 7 interposed therebetween and also those arranged at positions where the ribs are connected to the stiffeners 13 via the side wall 9. Similarly, as illustrated in FIG. 8, the plural ribs 17b arranged in the hollow part 25b include those arranged at positions opposite the body frames 6 or stiffeners 12 with the front wall 8 interposed therebetween and also that arranged at a position opposite the stiffener 11 with the bottom wall 7 interposed therebetween. Further, as depicted in FIG. 10, the plural ribs 17c arranged in each hollow part 25c include that arranged at a position opposite the stiffener 12 with the front wall 8 interposed therebetween and also that arranged at a position opposite the stiffener 13 with the side wall 9 being interposed therebetween.

As illustrated by way of example in FIG. 9, each sloping plate 14 in the associated hollow part 25a is arranged such that it is maintained in contact with each of the associated plural ribs 17a. Also as illustrated by way of example in FIGS. 6 and 8, the sloping plate 15 in the hollow part 25b is arranged such that it is maintained in contact with each of the plural ribs 17b. Further, as illustrated by way of example in FIG. 10, each sloping plate 16 in the associated hollow part 25c is arranged such that it is maintained in contact with each of the associated plural ribs 17c.

Figure 11:
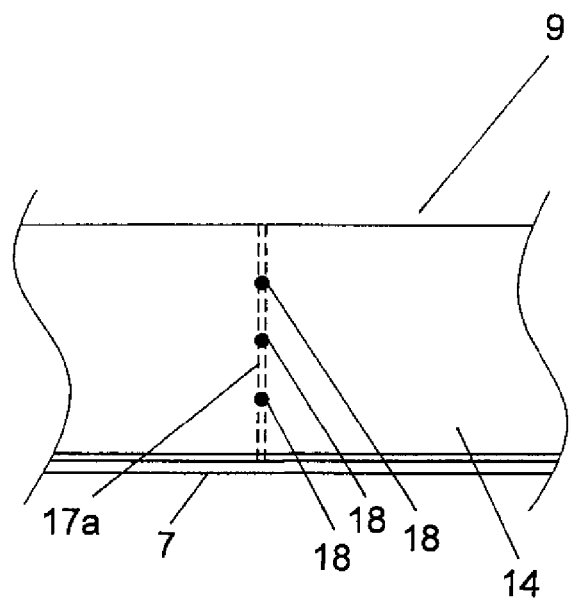
FIG. 11 A view taken in the direction of arrow F in FIG. 9 and illustrating an area corresponding to area H in FIG. 5.

As shown by way of example in FIG. 11 which is a view taken in the direction of arrow F in FIG. 9 and illustrates the area corresponding to area H in FIG. 5, each of the ribs 17a arranged in each hollow part 25a and the associated sloping plate 14 have been fixed together by placing fillers in the respective ones of plural small circular holes 18 formed through the sloping plate 14, and then performing plug welding. Although not illustrated in any figure, each of the ribs 17b arranged in the hollow part 25b and the sloping plate 15 has been similarly fixed together by placing fillers in the respective ones of plural small circular holes formed through the sloping plate 15, and then performing plug welding. Although not illustrated either in any figure, each of the ribs 17c arranged in each hollow part 25c and the associated sloping plate 16 has been similarly fixed together by placing fillers in the respective ones of plural small circular holes formed through the sloping plate 16, and then performing plug welding.

In the payload section defined by the bottom wall 7, front wall 8 and left and right side walls 9 of the body 5 according to the first embodiment constructed as described above, a payload such as, for example, earth or sand is loaded in a heap as described above. In this state, the front wheels 1 and rear wheels 2 of the dump truck shown in FIG. 1 are driven to travel so that the work to haul the payload to a desired place is performed. After the payload on the body 5 is dumped at the desired place, traveling is performed again with no payload to a next place where another payload exists, and hauling work of the payload such as earth or sand onto the body 5 is performed there. Normally, such loading work and hauling work are repeatedly performed.

According to the above-described first embodiment, the plural steel ribs 17a-17c are arranged in the hollow parts 25a-25c formed between the earth/sand anti-sticking devices, in other words, the sloping plates 14-16 arranged in the corner parts of the bottom wall 7, front wall 8 and left and right side walls 9 defining the payload section and the associated ones of the bottom wall 7, front wall 8 and left and right side walls 9 arranged opposite the sloping plates 14-16, respectively, so that by these ribs 17a-17b, the associated ones of the bottom wall 7, front wall 8 and left and right side walls 9 can be reinforced. Therefore, sufficient rigidity can still be assured even if the stiffeners 11, 12, 12a, 13 installed on the parts of the outer sides of the payload section are made fewer.

As the ribs 17a-17c are arranged in the hollow parts 25a-25c between the sloping plates 14-16 and the associated ones of the bottom wall 7, front wall 8 and left and right side walls 9, respectively, the ribs 17a-17c can be significantly reduced in shape and dimensions compared with the stiffeners 11, 12, 12a, 13 installed on the parts of the outer sides of the payload section. Accordingly, the total weight of the stiffeners 11, 12, 12a, 13 and the ribs 17a-17c can be significantly reduced compared with the total weight that would result if only stiffeners were installed in a large number, and therefore, the weight of the body 5 can be reduced.

As has been described above, the body 5 according to the first embodiment can assure a light weight and also sufficient rigidity. It is thus possible to increase the authorized payload of the payload section and to improve the efficiency of hauling work by the dump truck. Moreover, the dump truck can enjoy improved travel fuel efficiency, and therefore, can assure excellent economy.

The two walls that form any one of the combinations of associated ones of the bottom wall 7, front wall 8 and left and right side walls 9 are reinforced by the associated ones of the ribs 17a-17c, and therefore, the two walls can be set smaller in thickness. The setting of such a smaller wall thickness can, therefore, realize a further weight reduction. As a consequence, the authorized payload can be increased, and in addition, a contribution can be made toward improving the travel fuel efficiency. Further, the material cost for the walls can be reduced so that the manufacturing cost of the body 5 can be reduced. Furthermore, the setting of a smaller thickness for the walls to which the ribs 14-16 are to be fixedly secured makes it possible to weld these walls together without needing beveling edge preparation upon welding them together. It is, therefore, possible to decrease the work man-hour required for welding the associated ones of the walls together and also to reduce the number of fillers to be consumed in the welding. This can also reduce the manufacturing cost of the body 5.

As the earth/sand anti-sticking devices are formed of the sloping plates 14-16 which are in turn made of steel plates, these sloping plates 14-16 can be welded with the associated ones of the bottom wall 7, front wall 8 and left and right side walls 9. Therefore, these sloping plates 14-16 can be firmly and fixedly secured to the associated ones of the bottom wall 7, front wall 8 and left and right side walls 9, and a stable structure can be realized.

Further, the sloping plates 14-16 are arranged as discrete members from the associated ones of the bottom wall 7, front wall 8 and left and right side walls 9. The earth/sand anti-sticking devices can, therefore, be arranged with relative ease by welding the sloping plates 14-16 to the associated ones of the bottom wall 7, front wall 8 and left and right side walls 9 without needing cumbersome bending work for the formation of the earth/sand anti-sticking devices on the associated ones of the bottom wall 7, front wall 8 and left and right side walls 9. Therefore, the sloping plates 14-16 are highly practical.

The earth/sand anti-sticking devices, that is, the sloping plates 14-16 and the ribs 17a-17c have been brought into contact with each other and then fixed together by plug welding. Therefore, the load of a payload can be transmitted from the sloping plates 14-16 to the ribs 17a-17c, and the loads transmitted to the ribs 17a-17c can then be transmitted and distributed to the associated ones of the bottom wall 7, front wall 8 and left and right side walls 9. As a consequence, the load to be applied to the sloping plates 14-16 can be decreased, and therefore, the sloping plates 14-16 can be improved in durability to realize a body structure of high reliability.

The plural ribs 17a arranged in each hollow part 25a include those arranged at positions opposite the stiffeners 11 secured on the bottom wall 7 and also those arranged at positions opposite the stiffeners 13 secured on the associated side wall 9. A load of a payload, which is transmitted via the ribs 17a, can hence be surely transmitted to the stiffeners 11, 13 via the bottom wall 7 and the associated side wall 9. Similarly, the plural ribs 17b arranged in the hollow part 25b include those arranged at positions opposite the stiffeners 12 secured on the front wall 8 and those arranged at positions opposite the body frames 6 or associated stiffener 11 secured on the bottom wall 7. A load of the payload, which is transmitted via the ribs 17b, can hence be surely transmitted to the stiffeners 12 and the stiffener 11 or body frames 6 via the front wall 8 and the bottom wall 7. Further, the plural ribs 17c arranged in each hollow part 25c include that arranged at a position opposite the stiffener 12a secured on the front wall 8 and that arranged at a position opposite the stiffener 13 secured on the associated side wall 9. A load of the payload, which is transmitted via the ribs 17c, can hence be surely transmitted to the stiffeners 12a, 13 via the front wall 8 and the associated side wall 9. As a consequence, high rigidity can be assured, thereby making a contribution to the realization of a body structure of high reliability.

Figure 12:
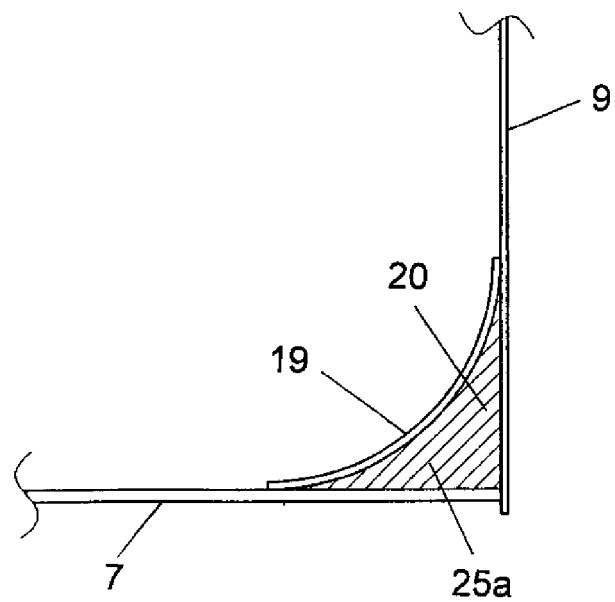
FIG. 12 A fragmentary view illustrating a second embodiment of the body according to the present invention.

FIG. 12 is a fragmentary view illustrating the second embodiment of the body according to the present invention. The second embodiment an essential part of which is illustrated in FIG. 2 is constructed with curved steel plates 19, each of which is arranged as a discrete member from the bottom wall 7 and the associated side wall 9 in place of the sloping plate 14 in the above-described first embodiment and forms a curved surface. Because of this constitution, ribs 20 arranged in each hollow part 25a, which is formed by the bottom wall 7 and the associated side wall 9 and curved plate 19, are formed with a profile conforming to the curved surface of the curved plate 19 so that the ribs 20 can be maintained in contact with the curved plate 19 over sufficiently large regions. Although not illustrated in any figure, similarly arranged are a curved steel plate, which is arranged as a discrete member from the bottom wall 7 and front wall 8 in place of the sloping plate 15 in the first embodiment and forms a curved surface, and ribs formed with a profile conforming to that of the curved plate. Although not illustrated in any figure, also similarly arranged are curved steel plates, each of which is arranged as a discrete member from the front wall 8 and the associated side wall 9 in place of the corresponding sloping plate 16 in the first embodiment and forms a curved surface, and ribs formed with a profile conforming to that of the curved plate. The remaining construction is similar to the above-described first embodiment.

Also in the second embodiment constructed as described above, the ribs 20 are arranged in each hollow space 25a formed by the bottom wall 7 and the associated side wall 9 and curved plate 19, similar ribs are arranged in the hollow space 25b formed by the bottom wall 7, the front wall 8 and a similar curved plate, and similar ribs are arranged in each hollow space 25c formed by the front wall 8, the associated side wall 9 and a similar curved plate. These curved plates 19 and ribs 20 have been arranged in contact with each other and then plug-welded. The second embodiment can, therefore, bring about similar advantageous effects as the above-described first embodiment.

Figure 13:
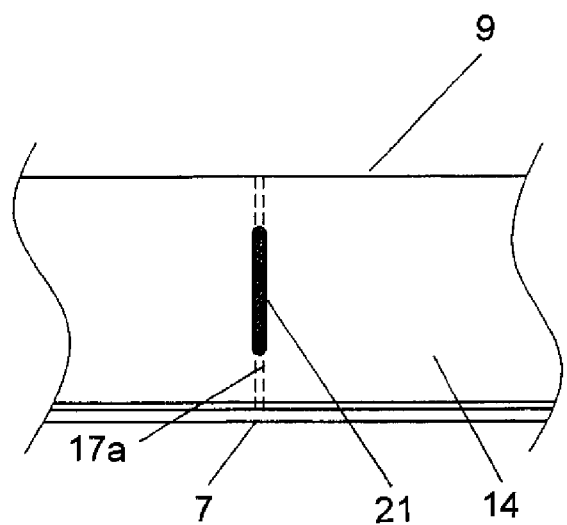
FIG. 13 A fragmentary view illustrating a third embodiment of the body according to the present invention.

FIG. 13 is a fragmentary view illustrating the third embodiment of the body according to the present invention. In the above-described first embodiment, the plural small circular holes 18 for each rib 17a are formed through each sloping plate 14 to perform plug welding. In the third embodiment an essential part of which is illustrated in FIG. 13, each sloping plate 14 and each of the associated ribs 17a have been fixed together by forming a slot 21 in place of the small circular holes 18 through the sloping plate 14, placing a filler plug in the slot 21, and then conducting plug welding. Although not shown in any figure, the sloping plate 15 and each of the associated ribs 17b have also been fixed together in a similar manner as described above by forming a slot along an upper edge portion of the rib 17b in place of such small circular holes through the sloping plate 15, placing a filler in the slot, and then conducting plug welding. Although not shown in any figure, each sloping plate 16 and each of the associated ribs 17c have also been fixed together in a similar manner as described above by forming a slot along an upper edge portion of the rib 17c in place of such small circular holes through the sloping plate 16, placing a filler in the slot, and then conducting plug welding. The remaining construction is similar to the above-described first embodiment.

In the third embodiment constructed as described above, the sloping plates 14-16 and the associated ones of the ribs 17a-17c have been fixed together by plug welding with the fillers placed in the slots 21. The third embodiment can, therefore, bring about similar advantageous effects as the above-described first embodiment.

In each of the above-described embodiments, the ribs 17a-17c are arranged in the associated hollow spaces 25a-25c such that each hollow space is provided with plural ribs. However, at least one of the hollow spaces 25a-25c may be provided with only one of the associated ribs 17a, 17b or 17c.

In the foregoing, the sloping plates 14-16 or curved plates 19 have been plug-welded with the associated ribs 17a-17c or ribs 20. The sloping plates 14-16 or curved plates 19 may, however, be arranged such that they are simply maintained in contact with the associated ribs without plug welding. A modification constructed as described above can bring about substantially the same advantageous effects as the first embodiment.

Where it is not necessary to consider so much a reduction of a load to be applied to the sloping plates 14-16 or curved plates 19, the sloping plates 14-16 or curved plates 19 and the ribs 17a-17c or ribs 20 may be arranged with clearances left therebetween without bringing the sloping plates 14-16 or curved plates 19 into contact with the ribs 17a-17c or ribs 20. In the modification constructed as described above, mounting errors of the respective members upon manufacture of the body 5 can be absorbed by the above-described clearances, and therefore, the manufacture of the body 5 can be simplified. This modification is hence highly practical.

In the foregoing, the steel member arranged opposite each earth/sand anti-sticking device is formed of the bottom wall 7 and the like. As an alternative, for example, the bottom wall may be made of a flexible member such as a rubber mat, the steel member arranged opposite an earth/sand anti-sticking device arranged at a corner part of the flexible member such as a rubber mat may be formed of a steel frame that forms the frame of the body 5, ribs similar the ribs 14-16 or ribs 20 in the above-described embodiments may be arranged in a space formed between the steel frame and the earth/sand anti-sticking device formed of the rubber mat or the like, and these ribs may be fixed to the steel frame by welding. In the modification constructed as described above, the steel frames located opposite the respective earth/sand anti-sticking devices can be reinforced by the ribs similar to the ribs 14-16 or ribs 20.

The modification constructed as described above can, therefore, bring about similar advantageous effects as the above-described first embodiment.

LEGEND

1 Front wheels
2 Rear wheels
3 Frame
4 Operator's cab
5 Body
6 Body frames
7 Bottom wall (steel-made member)
8 Front wall (steel-made member)
9 Side walls (steel-made members)
10 Canopy
10a Stiffener
10b Stiffeners
11 Stiffeners
12 Stiffeners
12a Stiffener
13 Stiffeners
14 Sloping plates (earth/sand anti-sticking devices)
15 Sloping plate (earth/sand anti-ticking device)
16 Sloping plates (earth/sand anti-sticking devices)
17a Ribs
17b Ribs
17c Ribs
18 Small circular holes
19 Curved plates (earth/sand anti-sticking devices)
20 Ribs
21 Slot
25a Hollow parts (spaces)
25b Hollow part (space)
25c Hollow parts (spaces)

The invention claimed is:

1. A body for a dump truck, said body being configured to be mounted on a frame of the dump truck, the body comprising:
   a body frame,
   a bottom wall, front wall, and left and right side walls arranged on the body frame, said bottom wall, front wall and left and right side walls defining a payload section for loading a payload therein,
   an earth/sand anti-sticking device arranged in a corner part of the payload section to prevent earth or sand, which is to be loaded in the payload section, from sticking in the corner part, the earth/sand anti-sticking device being made of a steel plate that is arranged as a discrete member from the associated ones of the bottom wall, front wall and left and right walls, and
   a steel member arranged outside and opposite the earth/sand anti-sticking device such that a space is formed between the steel member and the earth/sand anti-sticking device, wherein:
      the body is provided with at least one rib made of steel and arranged in the space, fixedly secured to the steel member to reinforce the steel member, and arranged extending upright toward the earth/sand anti-sticking device,
      the steel member is formed of at least one combination of mutually-adjacent plural walls of the bottom wall, front wall and left and right side walls,
      the plural walls in the combination are brought into contact with each other and welded,
      the rib is shaped to close the space, and the space is closed by the rib, and the rib is fixedly secured to the respective walls in the combination by welding so as to form a triangular prism shaped hollow part that is configured by the rib, the respective walls in the combination, and the earth/sand anti-sticking device.

2. The body according to claim 1, wherein:
the steel plate is formed of a sloping plate arranged aslant relative to the associated walls or a curved plate forming a curved surface.

3. The body according to claim 2, wherein:
the sloping plate or curved plate and the rib are fixed together by plug welding.

4. The body according to claim 1, wherein:
the earth/sand anti-sticking device and the rib are arranged in contact with each other.

5. The body according to claim 4, wherein:
the bottom wall, front wall and left and right walls are made of steel plates, respectively,
a steel stiffener is installed on an outer side of one of the bottom wall, front wall and left and right walls to reinforce the associated wall, and
the stiffener is installed at a position such that the rib is connected to the stiffener with the associated wall interposed therebetween.

6. The body according to claim 1, wherein
the rib contacts a junction defined by a contact point between two steel members.

7. The body according to claim 6, wherein
a surface of the earth/sand anti-sticking that faces the payload section is formed by a sloping plate that is flat, and
the rib and the sloping plate are in contact along a length of the sloping plate.

8. The body according to claim 7, wherein
the sloping plate has a hole, and
the hole is filled with a weld material that joins the sloping plate to the rib at the hole.

* * * * *